United States Patent Office 2,939,915
Patented June 7, 1960

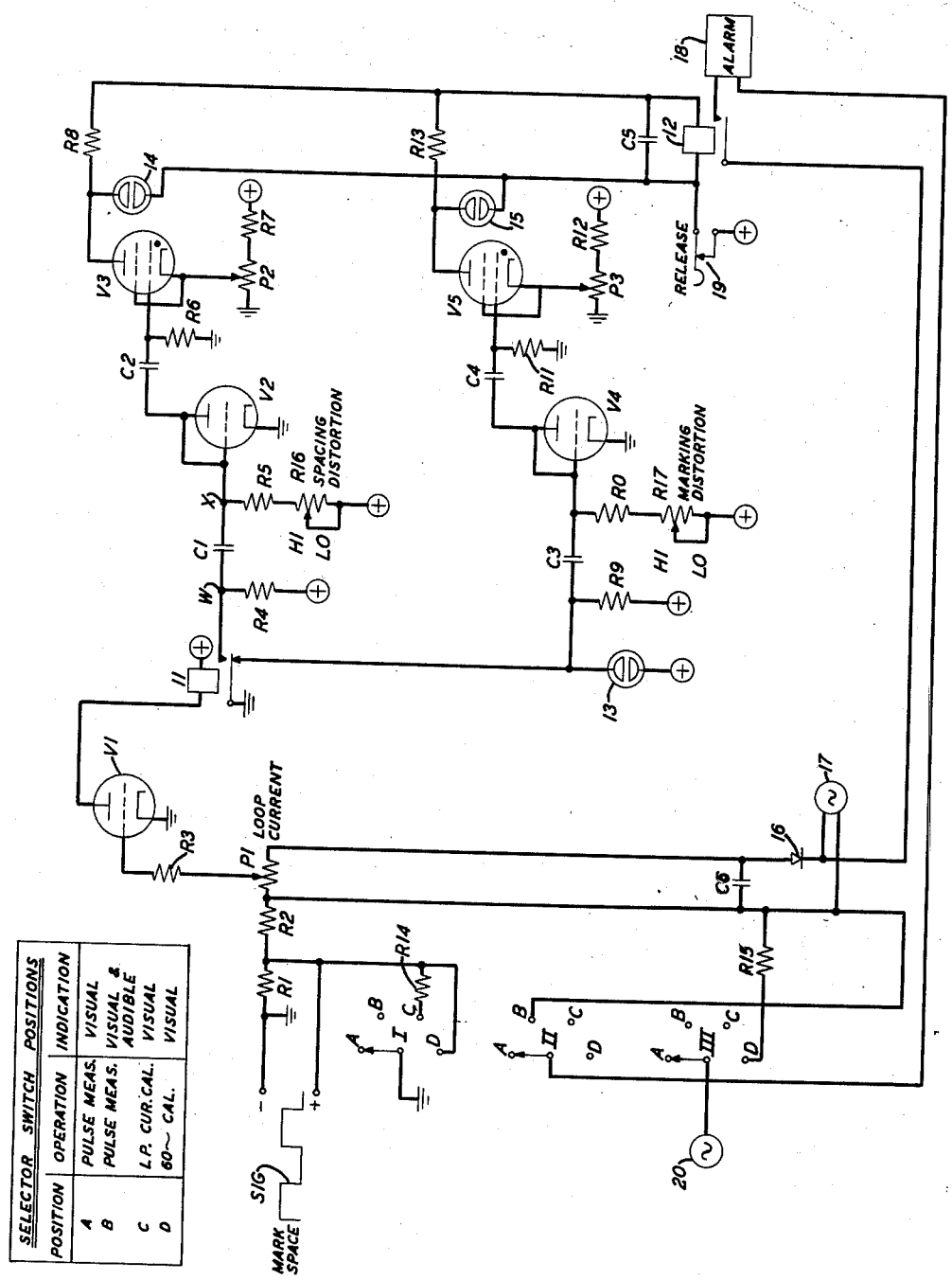

2,939,915

PULSE MEASUREMENT

Horace J. Britt, Alexandria, and Francis R. Cosh, Arlington, Va., assignors to American Telephone and Telegraph Company, a corporation of New York Filed Mar. 17, 1958, Ser. No. 721,932

9 Claims. (Cl. 178—69)

This invention relates to pulse distortion measuring equipment and, more particularly, to the measurement of the pulses in telegraph signals.

Three basic types of distortion are recognized which effect the reliability of telegraph signals, namely, bias, characteristic, and fortuitous. Bias distortion, the most prevalent of these, manifests itself as a uniform lengthening or shortening of the marking or spacing pulses. Characteristic distortion also affects pulse length, tending to lengthen or shorten the shorter pulses, the effect being greatest upon the shortest or unit pulse. Fortuitous distortion operates on a random basis to affect either marking or spacing pulses. A common feature of each of these types of distortion is that the length of the pulse is effected thereby. This has given rise to a pulse measurement technique known as "shortest pulse measurement." Using this technique, the shortest pulse of a series of pulses is compared with what is known to be a unit length, and on the basis of this comparison, the amount of distortion is discernible. Clearly, this technique will detect each of the aforementioned three types of telegraph signal distortion when a reasonable sampling of pulses is made.

An object of the present invention is to provide a circuit capable of detecting and measuring the three basic types of signal distortion which operates upon the "shortest pulse measurement" principle.

The nature of the testing performed in telegraph systems necessitates the use of portable equipment. Such equipment for maximum value must exhibit several fundamental properties, among them, economy, ease of use, and reliability. Fortunately, advantage may be taken of the fact that many of the factors which render a set economical also render it easier to maintain. By providing a small number of distinct types of elements within each testing set, for instance, the stock of replacement parts will be smaller and the ease of replacement greater.

Another object of the present invention is to provide a portable signal measuring device having a minimum number of distinct elements.

The reliability of an instrument is tied in closely with the situations in which it is employed. Portable instruments such as that contemplated by this invention are likely to be used in situations where the accuracy of measurement is important, but the available source of power is unstable or the lighting conditions are unsatisfactory. For this reason, the circuitry involved must have measuring capabilities which are relatively unimpaired by variations in supply voltage, and indicating means which are visible under adverse conditions.

Still another object of the present invention is to provide a signal measuring device with simple and reliable measurement indicating means, the reliability of which is relatively uneffected by moderate changes in supply voltage.

The aforementioned objects are attained in this invention through the utilization of a circuit wherein the input pulses are compared with a variable time constant subcircuit. When the duration of a compared pulse is less than a predetermined amount, a signal means is actuated and the percentage deviation from such predetermined amount is ascertainable from a dial setting. More specifically, according to this invention input pulses activate a normally cut-off triode causing it to conduct and operate a relay. Contacts of this relay effect the grounding of a normally charged capacitor and initiate the recharging thereof over a settable time constant circuit. In the event that the input pulse is shorter than that for which the timing circuit is set, a signal is generated which actuates a gas discharge device which in turn enables an indicating means. Thus, pulses shorter than a preset value cause the initiation of a signal. By providing a calibrated scale in connection with the setting means of the timing circuit, the exact amount by which a pulse deviates from a particular value is ascertainable.

Prior equipment for measuring telegraph signals has frequently required the signals to have particular formations of elements in order to operate. In addition to this, such equipment has often operated on only one type of impulse; i.e., either marking or spacing, not both. The elimination of these restricting requirements makes possible the monitoring of telegraph signals at any time and without prearrangements.

A feature of this invention is the provision of individual measuring circuits for marking and spacing impulses, which circuits are operative upon any combination of these impulses received.

Another feature of the present invention is the provision of a capacitive energy storage means within each measuring circuit, having two charging circuits selected by the input pulses. The first charging circuit is normally enabled; however, the presence of a pulse acts to disable it and render the second charging circuit effective. Upon cessation of the pulse before a predetermined period, the re-enablement of said first circuit results in operation of an indicating means.

For effective "trouble shooting," several elements of information relating to the signal are generally required. This information embraces the amount of peak distortion and the amount of bias distortion. In practice, it is often found, however, that as long as a signal does not exceed a particular amount of distortion, it is sufficiently intelligible and therefore does not require further consideration. Thus, equipment which merely monitors a signal to ensure that it does not exceed a particular amount of distortion is often all that is required.

Another feature of the present invention is the provision of means for ascertaining the amount of peak or bias distortion in a signal, or for monitoring the signal to ensure a predetermined amount of distortion is not exceeded.

Yet another feature is the provision of alternative indicating means for indicating the presence of more than a particular amount of distortion.

Still other features of this invention are means for calibrating the timing circuits from an alternating-current supply and means for selecting an appropriate point on the wave-shape of the input signal for correct measurement.

The foregoing, as well as additional objects and features, will be more clearly understood from the following description to be considered in connection with the drawing wherein the circuit of this invention is schematically depicted.

Considering the drawing, it will be seen that on the left thereof immediately beneath the input terminals there is a three-bank switch having four contacts on each bank. The circuit operation when the switch is in its various positions and the form of indication employed therewith are tabulated on the drawing and will be more fully discussed as the operation is explained in detail.

Examining the constituent parts of the circuit in the order incoming signals encounter them, normally nonconducting vacuum tube V1 is encountered. Loop current potentiometer P1, which derives voltage from the incoming signal and alternating-current source 17 as rectified by unidirectional current device 16 and smoothed by capacitor C6, is used to maintain V1 cut off except during application thereto of marking impulses. Potentiometer P1 is adjustable to accommodate the various loop currents normally available in telegraph systems. The plate of vacuum tube V1 is supplied from a positive voltage source through relay 11, in such a manner that relay 11 is energized whenever V1 conducts. Depending upon the state of relay 11, one of two contacts is grounded. These contacts are individually associated with pulse measuring subcircuits, the upper subcircuit, as illustrated in the drawing, measuring the duration of marking pulses, and the lower subcircuit, measuring the duration of spacing pulses.

The subcircuits are identical and comprise elements uniquely employed to compare the duration of the input pulses with a presettable value and to initiate a signal when that value is not attained. The similarity of these subcircuits will render it necessary to describe only one in detail. Each subcircuit comprises a capacitor C1, having a normal charge thereon when the respective pulses are not present. Occurrence of the appropriate pulse grounds one terminal of capacitor C1. During such grounding the other terminal is recharged via resistor R5 and spacing distortion variable resistor R16. The recharging of capacitor C1 is thereby facilitated through a variable time constant circuit governed by the setting of variable resistor R16. The positions of the slide or armature of resistor R16 are calibrated to indicate the percentage difference between the time constant of the circuit as set, and the time constant of the circuit as it would be set to receive unit length pulses. Because telegraph signals may be of various speeds, e.g., 60, 75, and 100 words per minute, the unit length of a pulse differs with each speed and a separate calibrated scale is therefore provided for each signal speed. A unidirectional current path to ground shunts resistors R5 and R16 and is in the form of triode V2. This tube has been selected for its similarity to the input triode V1, thereby offering minimum diversity of components; however, a diode could also be employed in the disclosed circuit configuration. Capacitor C2 couples capacitor C1 to the grid of thyratron V3. This gas tube is cathode biased by potentiometer P2 to permit firing when the pulse on the grid is of a preselected magnitude. Between the plate of thyratron V3 and the positive voltage supply there are parallel paths, one containing signal lamp 14 and the other resistor R8 and relay 12. A release switch 19 provides means for temporarily disconnecting the supply from this circuitry.

Alarm 18 is, like relay 12, common to both subcircuits and is energized by alternating-current source 17 to operate concurrently with either signal lamp 14 or 15. The operation of the alarm is determined by bank II of the selector switch. When the switch is in position B, a circuit is established which includes alternating-current source 17, contacts of relay 12, alarm 18, and the selector switch contacts.

The basic controls appearing in this circuit are the loop current potentiometer P1, the selector switch, marking and spacing distortion resistors R16 and R17, potentiometers P2 and P3, and release switch 19. The function of the loop current potentiometer P1 has already been mentioned.

The selector switch is employed to determine which operation the circuit will perform. In position A, connections are established for pulse measurement and for operation of signal lamps 14 and 15 in the event that a pulse is shorter than the recharge duration established by the setting of spacing or marking distortion resistors R16 and R17 in conjunction with tube V2. In position B, connections are established for pulse measurement and for operation of signal lamps 14 and 15 and alarm 18 in the event that a pulse is shorter than the recharge duration established by the setting of spacing or marking distortion resistors R16 and R17 in connection with tube V2. In positions C and D connections are established for calibration of the circuit: the first position being employed to adjust loop current potentiometer P1 so that a proper portion of the incoming waveform is used for measurement; and the second position being employed to calibrate spacing and marking distortion resistors R16 and R17 with respect to an alternating-current supply. Both of these calibration procedures are described hereinafter.

The various resistance values of spacing and marking distortion resistors R16 and R17, as already mentioned, are calibrated in order to indicate the amount of distortion present in the measured pulses. As is well-known in the art, spacing distortion manifests itself in the shortening of marking pulses, and marking distortion manifests itself in the shortening of spacing pulses. For this reason, the variable resistor in the subcircuit for measuring marking pulse duration is designated "spacing distortion" and vice versa. The actual calibration of the slider or armature position in terms of distortion is easily performed. First, one determines the proper setting for a pulse of unit duration so that the indicators are just activated. This is the point of zero distortion. The resistance is then decreased, providing a shorter time constant circuit, until a pulse of ten percent shorter duration just activates the indicators. This is the point of ten percent distortion. Using this procedure, a complete distortion scale for each signal speed is produced. The minimum distortion settings will be where the slider is set for maximum resistance and this is illustrated on the drawing by the designations "LO" and "HI" adjacent to the distortion resistors R16 and R17.

Potentiometers P2 and P3 control the bias on thyratrons V3 and V5 and receive their voltage from the same supply as the timing circuits. As described hereinafter, when a timing capacitor, either C1 or C3, is ungrounded upon termination of the measured pulse, a triggering pulse is transmitted through capacitor C2 or C4 respectively to the appropriate thyratron. The amplitude of this triggering pulse is determined by the state of the charge on the timing capacitor. The biasing of the thyratron is therefore effective to select only triggering pulses that are the result of particular conditions.

The nature and utilization of the thyratrons in this invention causes them to continue conduction even after termination of the triggering pulse. In order to reset them to an initial state, release switch 19 is inserted between the plate of these tubes and the voltage supply.

In order to specifically describe the operation of the circuit disclosed, it will be assumed that a signal SIG is applied at the input terminals. As shown, a marking impulse has a positive potential and a spacing impulse has zero potential. The positive potential is applied to the input terminal so designated. Initially, vacuum tube V1 is nonconducting and consequently the voltage on its plate is identical to the supply voltage which hereinafter will be referred to as +150 volts, it being understood that the particular value used is merely dependent upon the characteristics of the particular tubes or other devices used. The grid of tube V1 is normally biased negatively via resistor R3 to a value determined by the setting of loop current potentiometer P1. The potential across this potentiometer is derived in the circuit of this invention from alternating-current source 17 as rectified by diode 16 and smoothed by capacitor C6. When a marking pulse is applied at the input, the grid of tube V1 is driven sufficiently positive to cause conduction, and subsequent voltage reduction at the plate thereof, thereby energizing relay 11. This relay is advantageously of the mercury type and therefore follows the conduction process of tube V1 very closely. Energization of relay 11 causes establishment of a ground on its upper contact, thereby selecting the upper subcircuit for pulse measurement. When relay 11 is deenergized, its armature places ground on its lower contact, thereby selecting the lower subcircuit for pulse measurement. Thus, during the presence of a marking pulse, ground is applied to the upper contact and during the presence of a spacing pulse, ground is applied to the lower contact.

Initially, capacitor C1 is charged by +150 volts via resistor R4 on its left side, W, and through enabled tube V2 on its right side, X, to ground. Tube V2 is maintained in this enabled condition by +150 volts via spacing distortion resistor R16 and resistor R5. The charge on capacitor C1 therefore appears to be +150 volts at point W and a slightly positive value at point X. When a marking impulse is applied to the input terminals, relay 11 immediately grounds point W causing the voltage at that point to go to zero and simultaneously causing the voltage at point X to descend 150 volts to approximately −150 volts. This immediately cuts off tube V2. Capacitor C1 now begins recharging, its right terminal, X, seeking +150 volts via the path including resistor R5 and spacing distortion resistor R16. The time constant of this recharging circuit is dependent upon the setting of variable resistor R16. Assuming that the marking pulse is longer than unit length and that the impedance of resistor R16 is set for a unit length pulse, the voltage at point X ascends until a slightly positive value is reached, at which time tube V2 conducts clamping it at that value. Upon termination of the marking pulse, ground is removed from point W permitting +150 volts to be reapplied thereto. This reapplication of +150 volts causes a slightly positive pulse to appear at point X and to be transmitted through capacitor C2 to the control grid of thyratron V3. This pulse is of insufficient magnitude to fire the thyratron, however, due to the bias created by potentiometer P2.

In the event the marking impulse is shorter than unit length, the voltage at point X will not have achieved a value sufficient to cause tube V2 to conduct by the time the marking impulse terminates. In this event, reapplication of +150 volts to point W via resistor R4 results in the passage of a larger triggering pulse through capacitor C2 to the grid of thyratron V3 causing it to fire. The magnitude of the triggering pulse required to cause the firing of thyratron V3 is controlled by potentiometer P2 which establishes the potential upon its cathode. The setting of this potentiometer is adjusted so that the threshold of the tube is just above the amplitude of triggering pulses produced when the marking impulses terminate after tube V2 is conducting and thereby provides a shunting path to ground.

When thyratron V3 fires, its plate voltage decreases to a value sufficient to enable the ignition of neon lamp 14, which is supplied by a positive voltage via release switch 19. In accordance with normal operation of the thyratron, it continues conducting after the termination of the triggering pulse and consequently lamp 14 remains lit.

Simultaneously with the operation of lamp 14, relay 12 is energized, it being in parallel with both lamps 14 and 15. In the event the selector switch is in position B, operation of relay 12 and subsequent closure of its contacts will cause the energization of alarm 18 over a path from alternating-current source 17 through contacts of relay 12, alarm 18, and selector switch contact B in bank II.

It should be recognized that alternating-current source 17 may be replaced by any suitable source, its utilization in this circuit having been found expedient due to the already existing presence of alternating-current filament voltage for the operation of the electron tubes.

Measurement of the spacing pulse is performed in exactly the same fashion as that described above for the marking pulse.

In order to permit the universal application of this circuit to a variety of signals including loop currents of 20, 60, and 85 milliamperes, loop current potentiometer P1 is of such a value that the bias on tube V1 may be adjusted to accommodate such signals. Prior to making measurements, the following calibration procedure is followed.

Positioning of the loop current potentiometer to provide a bias for triode V1 that will result in operation of the circuit in the region of the center of the waveform of an input signal is obtained by setting the selector switch to position C. This places resistor R14 in parallel with resistor R1, both being of a value to provide proper input impedance. With the circuit closed, loop current potentiometer P1 is then adjusted to supply maximum positive bias and is then slowly readjusted until lamp 13 just lights. This indicates that triode V1 has ceased conducting and relay 11 is de-energized. The bias is now again increased positively by readjusting potentiometer P1 until lamp 13 is just extinguished. This indicates that triode V1 has resumed conduction and relay 11 is activated. The point midway between these settings will provide a bias on triode V1 such that it will conduct midway between the peak and null of the input wave form.

To establish a definite pulse length on the distortion dials of both the marking and spacing distortion resistors, R17 and R16, the selector switch is set to position D with no input applied. In this position, alternating-current source 20 is connected to the grid of triode V1 via resistor R15, loop current potentiometer P1, and resistor R3. Spacing and marking distortion resistors R16 and R17 are then set to a position of minimum resistance, indicated on the drawing as "HI." Lamps 14 and 15 are extinguished by momentarily pushing release switch 19. The variable resistors are adjusted toward the "LO" distortion position in order to establish the point at which their respective lamps just fail to light. These settings indicate what would be unit length for a pulse having the duration concomitant with the frequency of source 20. Knowing this, the calibrated scale may be oriented accordingly. Under normal operating conditions the most convenient alternating-current source will be 60 cycles; consequently, a mark may be placed right on the scale for this frequency.

The actual steps employed to use the circuit of this invention for determining peak and bias distortion are relatively simple and quite accurate as shown hereinafter.

Depending upon whether just a visual, or both a visual and audible alarm is desired, the selector switch is rotated to positions A or B, respectively. The equipment is then energized and pulses applied to the input terminal with the polarity shown on the drawing, loop current potentiometer P1 being set to provide the appropriate bias on tube V1 for the value of loop current being measured.

When making measurements, the objective is to find the lowest distortion dial setting where the associated lamp just does not light. As described hereinbefore, a lighted lamp indicates the distortion is higher than the dial setting. Since the lamp locks up, it must be extinguished each time a new dial setting is sought by pressing release switch 19. The proper setting of the distortion dial is established by slowly rotating the respective resistor from a reasonably high distortion setting (low resistance) to a point when the lamp just does not light. This is done with both the spacing distortion and marking distortion resistors.

The highest reading of the two calibrated dials is the peak distortion of the telegraph signals being received and the difference between the readings is the bias. If the marking distortion is greater than the spacing distortion, this bias would be "marking" bias. In this manner, accurate determinations of the amount of distortion may be obtained.

It is recognized that in many instances the exact amount of distortion is not of interest, it being sufficient to know merely the quality of the signal. It may be satisfactory, for instance, to merely have assurance that the signal exhibits a distortion of less than 15 percent. By setting both distortion potentiometers to a value of 15 percent distortion, it is possible to monitor the signals and any distortion above 15 percent will be indicated by a lighting of the lamps 14 or 15 or by operation of alarm 18.

Although an efficient and effective circuit has been described for the measurement of telegraph signals, it is understood that the measurement technique may be employed in any pulse measuring application. The above description of the operation of the circuit serves to disclose the principles involved in the present invention. Numerous changes may be made by those skilled in the art without departing from the spirit and teaching of this invention and for that reason, there is no intention of limiting it to the embodiment illustrated herein.

What is claimed is:

1. A pulse length measuring circuit comprising an energy storage means having two terminals, a source of potential, means for alternately connecting one of said terminals to ground and said potential, a charging circuit connected between the other of said terminals and said potential, means for maintaining the potential on said other terminal below a predetermined value, and signal means connected to said other terminal and activated when said one terminal is connected to said potential while said other terminal is not at said predetermined value.

2. A circuit for measuring pulse length comprising a capacitor having a first and second terminal, a source of voltage, means for connecting said first terminal to ground and said positive voltage during the respective presence and absence of said pulse, a variable impedance charging path connected between said second terminal and said positive voltage, means preventing said second terminal from achieving a voltage more positive than a predetermined value, and signal means connected to said second terminal and activated when said first terminal is ungrounded before said second terminal achieves said predetermined value.

3. A pulse length measuring circuit comprising an electron tube biased to conduct during the application of said pulse thereto a timing capacitor having one terminal normally residing at a positive potential, switch means operative on conduction of said electron tube to ground said one terminal, a positive potential source, a variable impedance charging path connected between the other terminal of said capacitor and said positive potential source, shunting means for maintaining the potential on said other terminal below a predetermined value, and signal means connected to said other terminal and activated when said one terminal is ungrounded while said other terminal is not at said predetermined value.

4. A pulse length measuring circuit as defined by claim 3 wherein said signal means comprises a gas tube having a control element and biased to conduct upon application of a predetermined potential thereto, a coupling capacitor for transmitting potential changes from said other terminal of said timing capacitor to said control element, and indicating means operable when said gas tube conducts.

5. In a pulse length measuring circuit a timing capacitor having a first and second terminal, a source of positive voltage, first switching means for alternately connecting said first terminal to ground and to said source of positive voltage, an adjustably biased input device for controlling said first switching means, a calibrated charging circuit connected between said second terminal and said source of positive voltage, said calibration indicating circuit connected between said second terminal and circuit as set and a predetermined value, means for maintaining the voltage on said second terminal below a particular value, a gas tube having a cathode, plate, and control element, adjustable biasing means for said gas tube connected to said cathode and deriving its potential from said source of positive voltage, a coupling capacitor for transmitting voltage changes from said second terminal of said timing capacitor to said control element, indicating means controlled by said gas tube and operative when said voltage change exceeds a predetermined value, second switching means shunting said indicating means and actuated therewith, means controlling the continuous application of said positive voltage to the plate of said gas tube via said indicating and second switching means, audible alarm means optionally operative on actuation of said second switching means, and selecting means for exercising said option.

6. A pulse length measuring circuit comprising an energy storage means having two terminals, means for alternately charging and grounding one of said terminals, charging means connected to the other of said terminals and operative while said one terminal is grounded for charging said energy storage means to a particular voltage level, calibrated means for controlling the period of time before said particular voltage level is attained, and indicating means connected to said other terminal and activated when said one terminal is ungrounded before said period of time has elapsed.

7. In a monitoring device for measuring the duration of marking and spacing impulses in a telegraph signal, an electron tube biased to conduct during the application thereto of marking impulses, relay means controlled by said electron tube and operative to select an individual measuring circuit for either said marking or said spacing impulses, each of said individual measuring circuits comprising, a source of potential, a timing capacitor having a first and second terminal, said first terminal being normally connected to said source of potential, means controlled by said relay means for grounding said first terminal in accordance with the individual measuring circuit selected, a charging path between said source of potential and said second terminal, means for maintaining the potential on said second terminal below a predetermined value, and signal means connected to said second terminal and activated when said first terminal is ungrounded before said second terminal achieves said predetermined value.

8. A monitoring device as defined in claim 7 wherein the signal means of said individual measuring circuits comprise a gas tube having a control element and biased to conduct upon application of a predetermined potential thereto, a coupling capacitor for transmitting potential changes from said second terminal of said timing capacitor to said control element, and indicating means operable when said gas tube conducts.

9. In a monitoring device for measuring the duration of marking and spacing impulses in a telegraph signal, an electron tube biased to conduct during the application thereto of marking impulses, relay means controlled by said electron tube and operative to select an individual measuring circuit for either said marking or said spacing impulses, each of said individual measuring circuits comprising, a source of positive voltage, a timing capacitor having a first and second terminal, said first terminal being normally connected to said source of positive voltage, contact means controlled by said relay means for grounding said first terminal in one measuring circuit during application of said marking impulse and for grounding said first terminal in the other measuring circuit during application of said spacing impulses, a calibrated charging circuit having means for varying the charging rate between said second terminal and said source of positive voltage, said calibration indicating the time relationship between the charging rate as set by said means and a predetermined rate, unidirectional current means connected to said second terminal and biased to maintain the voltage thereon below a particular value, a gas discharge device having a cathode, plate, and control element, adjustable biasing means for said gas discharge device connected to said cathode and deriving its voltage from said source of positive voltage, a coupling capacitor for transmitting voltage changes from said second terminal of said timing capacitor to said control element, said adjustable biasing means being set to permit enablement of said gas discharge device when said voltage change exceeds a predetermined value, control means for controlling the application of said positive voltage to said plate, visual signaling means interposed between said control means and said plate and operative when said gas discharge device is enabled, switching means shunting both said visual signaling means and actuated when either gas discharge device is enabled, selecting means, and audible signaling means operative under the control of said selecting means when said switching means is actuated.

References Cited in the file of this patent

UNITED STATES PATENTS

| | | |
|---|---|---|
| 2,132,678 | Cowan | Oct. 11, 1938 |
| 2,360,702 | Martin et al. | Oct. 17, 1944 |
| 2,410,809 | Cory | Nov. 12, 1946 |
| 2,597,071 | Cory | May 20, 1952 |
| 2,715,157 | Cannon | Aug. 9, 1955 |